(12) United States Patent
Nabity

(10) Patent No.: US 10,835,080 B2
(45) Date of Patent: Nov. 17, 2020

(54) GREASE CATCHER

(71) Applicant: Fryer Guard, Inc., Kearney, NE (US)

(72) Inventor: Collin Nabity, Kearney, NE (US)

(73) Assignee: Fryer Guard, Inc., Kearney, NE (US)

( * ) Notice: Subject to any disclaimer, the term of this patent is extended or adjusted under 35 U.S.C. 154(b) by 363 days.

(21) Appl. No.: 15/662,379

(22) Filed: Jul. 28, 2017

(65) Prior Publication Data

US 2018/0103801 A1    Apr. 19, 2018

Related U.S. Application Data

(60) Provisional application No. 62/409,637, filed on Oct. 18, 2016.

(51) Int. Cl.
   *A47J 37/12*    (2006.01)

(52) U.S. Cl.
   CPC ....... *A47J 37/1271* (2013.01); *A47J 37/1223* (2013.01); *A47J 37/1285* (2013.01)

(58) Field of Classification Search
   CPC .................. A47J 37/1223; A47J 37/1285
   USPC ...... 99/408; 210/167.8, DIG. 8, 241, 167.28
   See application file for complete search history.

(56) References Cited

U.S. PATENT DOCUMENTS

| | | | | |
|---|---|---|---|---|
| 5,228,985 A | * | 7/1993 | Wells ............... | A47J 37/1223 210/167.28 |
| 5,823,097 A | * | 10/1998 | Dirck ............... | A47J 37/1271 99/408 |
| 6,364,120 B1 | * | 4/2002 | Sanchez ........... | A47J 37/1223 210/435 |
| 2018/0084949 A1 | * | 3/2018 | Hohler ............. | A47J 37/1285 |

FOREIGN PATENT DOCUMENTS

EP        2103240 A1  *  9/2009  .......... A47J 37/1285

* cited by examiner

*Primary Examiner* — Reginald Alexander
(74) *Attorney, Agent, or Firm* — Mallory M. Henninger; Advent, LLP

(57) ABSTRACT

A grease catcher apparatus for a frying apparatus can include a support assembly for positioning under the frying apparatus. The support assembly can be configured to receive a removable tray for catching grease from the frying apparatus. The grease catcher apparatus can also include at least one side wall extending generally upwardly from the support assembly. In some embodiments, the side wall may slope toward the removable tray, e.g., for directing the grease into the tray. In some embodiments, the support assembly may include a first support segment and a second support segment positionable across from one another, where each support segment has a base ledge, e.g., for supporting opposite sides of the removable tray. In some embodiments, the support assembly may include a partial enclosure defining an opening for permitting passage of grease, e.g., from the frying apparatus to the removable tray.

20 Claims, 5 Drawing Sheets

GREASE CATCHER

CROSS-REFERENCE TO RELATED APPLICATIONS

The present application claims the benefit under 35 U.S.C. § 119(e) of U.S. Provisional Application Ser. No. 62/409,637, filed Oct. 18, 2016, and titled "GREASE CATCHER." U.S. Provisional Application Ser. No. 62/409,637 is herein incorporated by reference in its entirety.

BACKGROUND

A frying apparatus (e.g., fryer, frier, deep fat fryer, deep fryer, fryolator, etc.) is a kitchen appliance utilized for deep frying food items, particularly fast foods, in hot oil and making them crisp. Fryers include a tank for retaining the oil, one or more burners for heating the oil, and one or more submergible baskets for retaining the food items.

SUMMARY

A grease catcher apparatus for a frying apparatus can include a support for positioning under the frying apparatus. The support can be configured to receive a removable tray for catching grease from the frying apparatus. The grease catcher apparatus can also include at least one side wall extending generally upwardly from the support. In some embodiments, the side wall may slope toward the removable tray, e.g., for directing the grease into the tray. In some embodiments, the support may include a first support segment and a second support segment positionable across from one another, where each support segment has a base ledge, e.g., for supporting opposite sides of the removable tray. In some embodiments, the support may include a partial enclosure defining an opening for permitting passage of grease, e.g., from the frying apparatus to the removable tray.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Figure 1:
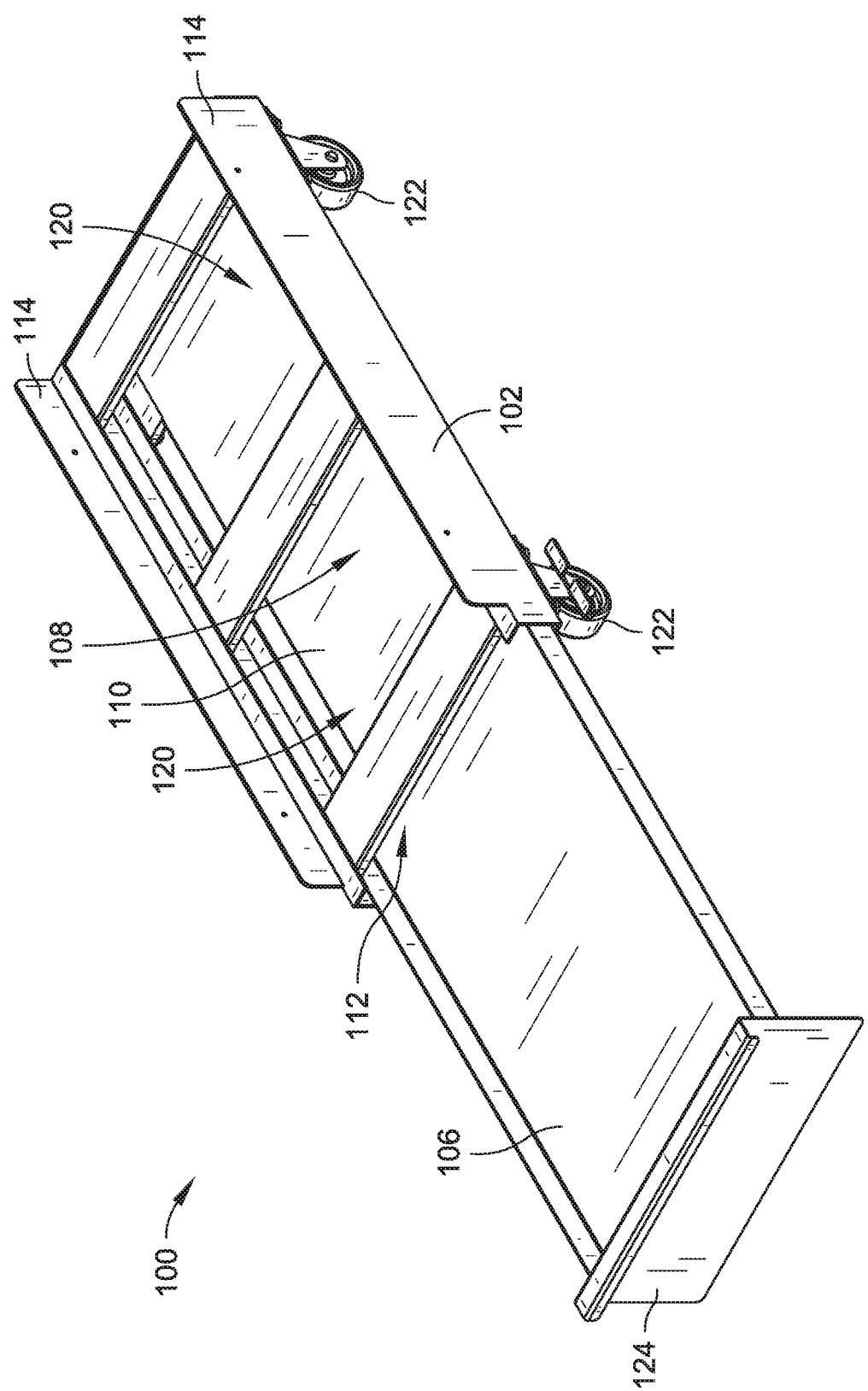
FIG. 1 is an isometric view illustrating a grease catcher apparatus configured to be disposed under a frying apparatus, the grease catcher being depicted with a removable tray in an open configuration, in accordance with an example embodiment of the present disclosure.

Frying apparatus (e.g., fryer, frier, deep fat fryer, deep fryer, fryolator, etc.) are commonly used in commercial cooking facilities (e.g., restaurants, catering facilities, etc.) to fry food in hot oil. A frying apparatus typically includes a tank for retaining oil, and submergible basket(s) for exposing a food item to the oil. The oil is heated by one or more burners positioned beneath the tank. While the tanks are meant to retain oil and/or grease without leakage, the tanks commonly deteriorate over time. For example, the tanks can develop micro-fractures, which permit oil and/or grease to leak from the tanks and accumulate beneath the frying apparatus. Grease and/or oil can also leak down the sides of the frying apparatus and/or from the submergible baskets. Leakage of oil and/or grease can lead to deterioration of underlying flooring. For example, grease acts as acid to grout in flooring, causing deterioration of the flooring over time. Additionally, accumulation of grease, oil, and/or other debris beneath the frying apparatus can prevent valves of the frying apparatus from operating properly (e.g., can prevent valves from opening and/or closing).

Accordingly, the present disclosure is directed to a grease catcher apparatus for a frying apparatus. A grease catcher apparatus for a frying apparatus can include a support assembly for positioning under the frying apparatus. The support assembly can be configured to receive a removable tray for catching grease from the frying apparatus. The grease catcher apparatus can also include at least one side wall extending generally upwardly from the support assembly. In some embodiments, the side wall may slope toward the removable tray, e.g., for directing the grease into the tray. In some embodiments, the support assembly may include a first support segment and a second support segment positionable across from one another, where each support segment has a base ledge, e.g., for supporting opposite sides of the removable tray. In some embodiments, the support assembly may include a partial enclosure defining an opening for permitting passage of grease, e.g., from the frying apparatus to the removable tray.

The grease catcher apparatus described herein creates a new way to keep kitchens and/or other cooking areas clean from grease spills and leaks that result from commercial fryers. Grease leaks through microfractures on fryers that, without using a grease catching apparatus, can end up on a kitchen floor. Prolonged exposure to grease can result in a kitchen floor becoming corrupted, requiring floors to be replaced. Alternatively, kitchen floors require, at a minimum, weekly scrubbing to remove grease that has leaked on floors and has been spread around by foot traffic in the kitchen. Scrubbing and mopping grease off of a kitchen floor can be difficult work. Further, grease in fryers can leak on caster wheels attached to the fryers. The caster wheels then become corrupted and need to be replaced. The grease catcher apparatus described herein remedies the above problems. The removable tray included within the grease catcher apparatus can be removed and easily cleaned in a commercial dishwasher or by hand. In addition, the grease catcher apparatus is designed to prevent food debris from accidentally finding its way underneath the fryer, which may be a food safety violation in many jurisdictions. The grease catcher apparatus described herein prevents corruption of kitchen floors, prevents/eliminates/minimizes the difficult task of scrubbing grease and/or oil from kitchen floors, and prevents a place of food preparation from unnecessary health code violations.

Referring generally now to FIGS. 1 through 6, a grease catcher apparatus 100 for a frying apparatus 104 is described. As shown, the grease catcher apparatus 100 can include a support assembly 102 for positioning and being disposed proximate to and/or under the frying apparatus 104. In implementations, a frying apparatus 104 can include an apparatus used to cook food, for example with hot oil (e.g., a deep fryer). The frying apparatus 104 may include a commercial fryer and/or a consumer fryer. In these implementations, the frying apparatus 104 can include a tank and/or container configured to hold a cooking liquid (e.g., oil). The tank and/or the container can be disposed over a grease catcher apparatus 100, the grease catcher apparatus 100 configured to catch a cooking liquid (e.g., grease, oil, and so forth) and/or other liquid dripping and/or falling from the frying apparatus 104 and/or the tank/container.

In implementations, the support assembly 102 can include a heat resistant material including, but not necessarily limited to steel, stainless steel, aluminum, other similar metals, and so forth. In some embodiments, the support assembly 102 material can be selected based on appearance, heat resistance, finish (e.g., similar to the finish of the frying apparatus 104), durability, and so forth. For example, both the frying apparatus 104 and the support assembly 102 can be formed form stainless steel. In implementations, the support assembly 102 can include at least one support member (e.g., a sheet of metal, a metal channel, angle metal).

With reference to FIGS. 1 through 4, a support assembly 102 can include a partial enclosure 108 configured for receiving a removable tray 106 for catching grease from the frying apparatus 104. For example, the support assembly 102 can include a base portion 110 defining a slot 112 for receiving the removable tray 106 (e.g., as described with reference to FIG. 1). The support assembly 102 can further include at least one side wall 114 extending generally upward from the support assembly 102. In one or more embodiments, the support assembly 102 includes a first side wall 116 and an opposing second side wall 118 configured for directing the grease onto the tray. In some embodiments, the side walls 114 can include generally L-shaped brackets. In other embodiments, the side wall 114(s) can slope toward the removable tray 106 to direct the grease onto the tray. In some embodiments, the side walls 114 can be configured for receiving a base of the frying apparatus 104 (e.g., the base can rest directly on the side walls 114). In other embodiments, one or more legs of the frying apparatus 104 can be mounted to the base portion 110 of the support assembly 102. The frying apparatus 104 can be secured to the support assembly 102 utilizing one or more suitable fasteners, including but not necessarily limited to: cap screws, screws, bolts, and so forth. It is to be understood that a wide variety of similar fasteners which will be well known to those skilled in the art may likewise be used to accomplish mounting of the frying apparatus 104 to the support assembly 102. In some embodiments, the frying apparatus 104 can be welded to the support assembly 102. The dimensions of the support assembly 102 can be selected to accommodate a standard-sized frying apparatus 104.

Figure 2:
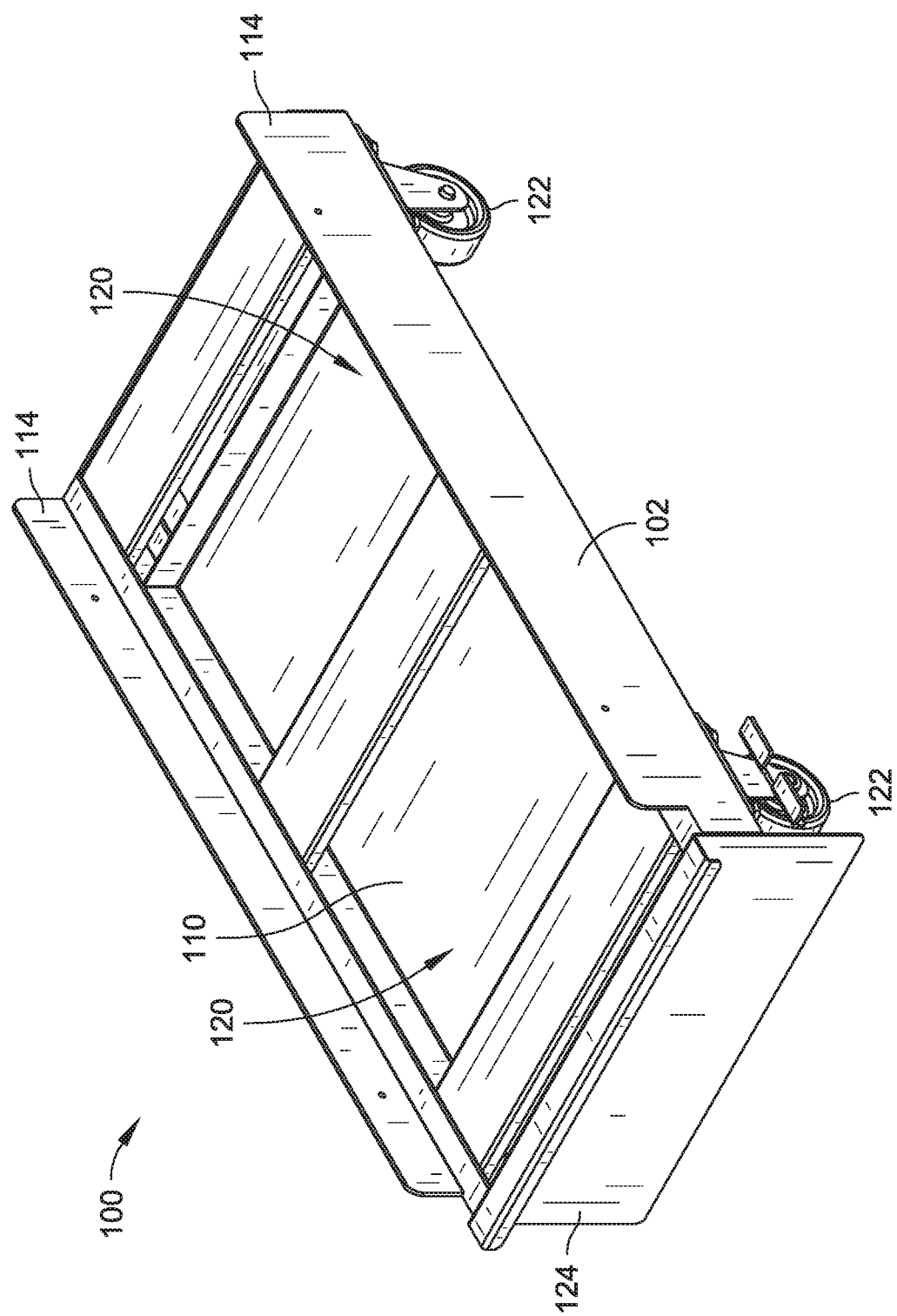
FIG. 2 is an isometric view illustrating the grease catcher apparatus illustrated in FIG. 1, where the grease catcher is depicted with the removable tray in a closed configuration, in accordance with an example embodiment of the present disclosure.

In embodiments, the partial enclosure 108 defines at least one opening 120 for permitting passage of grease from the frying apparatus 104 to the removable tray 106, as illustrated in FIG. 2. In one or more embodiments, one or more of the openings 120 are configured to correspond with one or more burners of the frying apparatus 104. For example, the support assembly 102 can include three openings 120 configured to correspond with three burners of the frying apparatus 104. The size, shape, and number of openings 120 can be selected to correspond with a standard frying apparatus 104. The partial enclosure 108 can also define one or more additional openings 120 for permitting the passage of grease from the frying apparatus 104 to the tray (e.g., as described with reference to FIG. 2). The additional openings 120 can capture grease that drips from the sides of the frying apparatus 104 and/or a basket of the frying apparatus 104.

Figure 3:
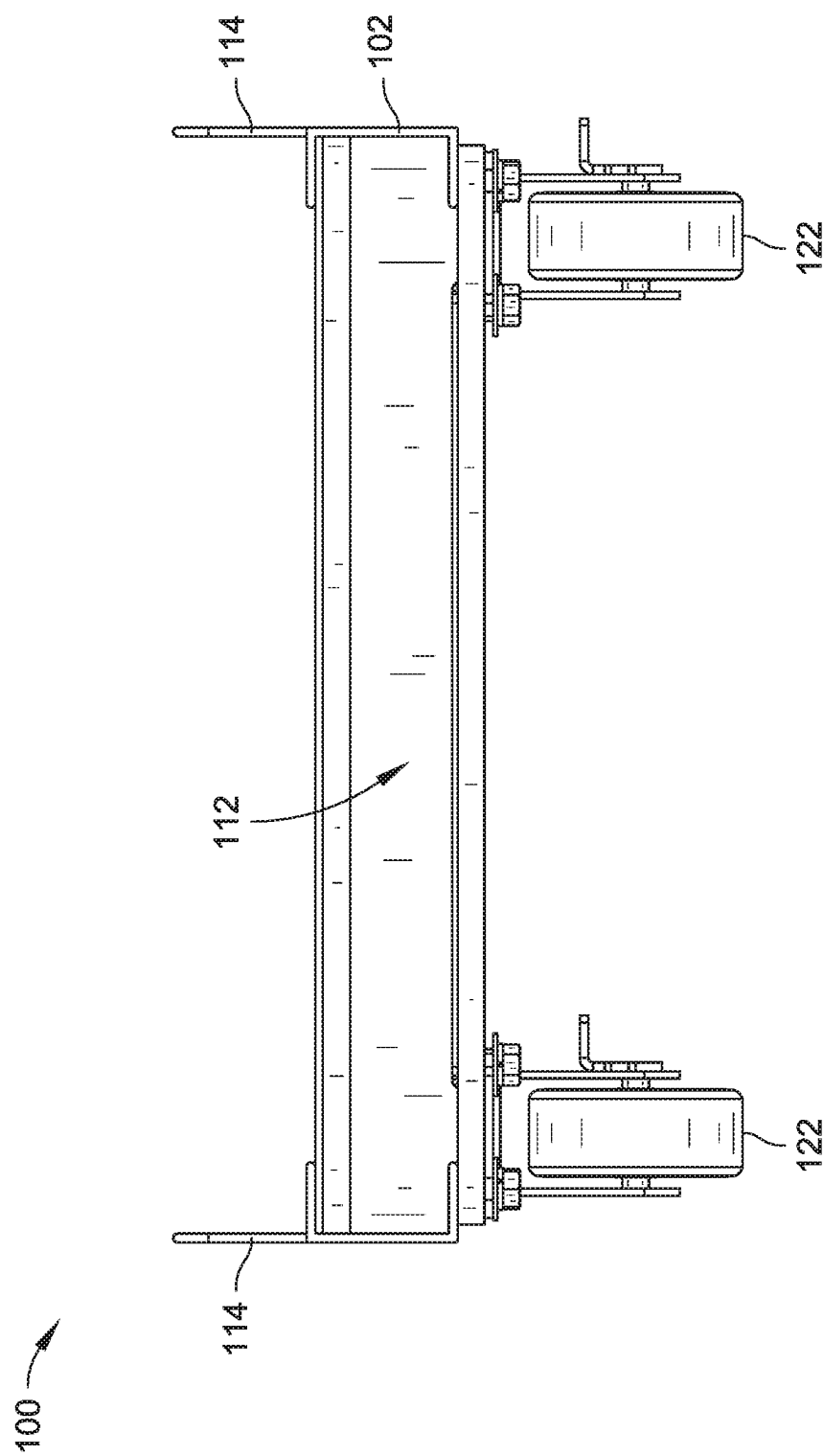
FIG. 3 is a side elevation view of the grease catcher apparatus illustrated in FIG. 1, in accordance with an example embodiment of the present disclosure.
Figure 4:
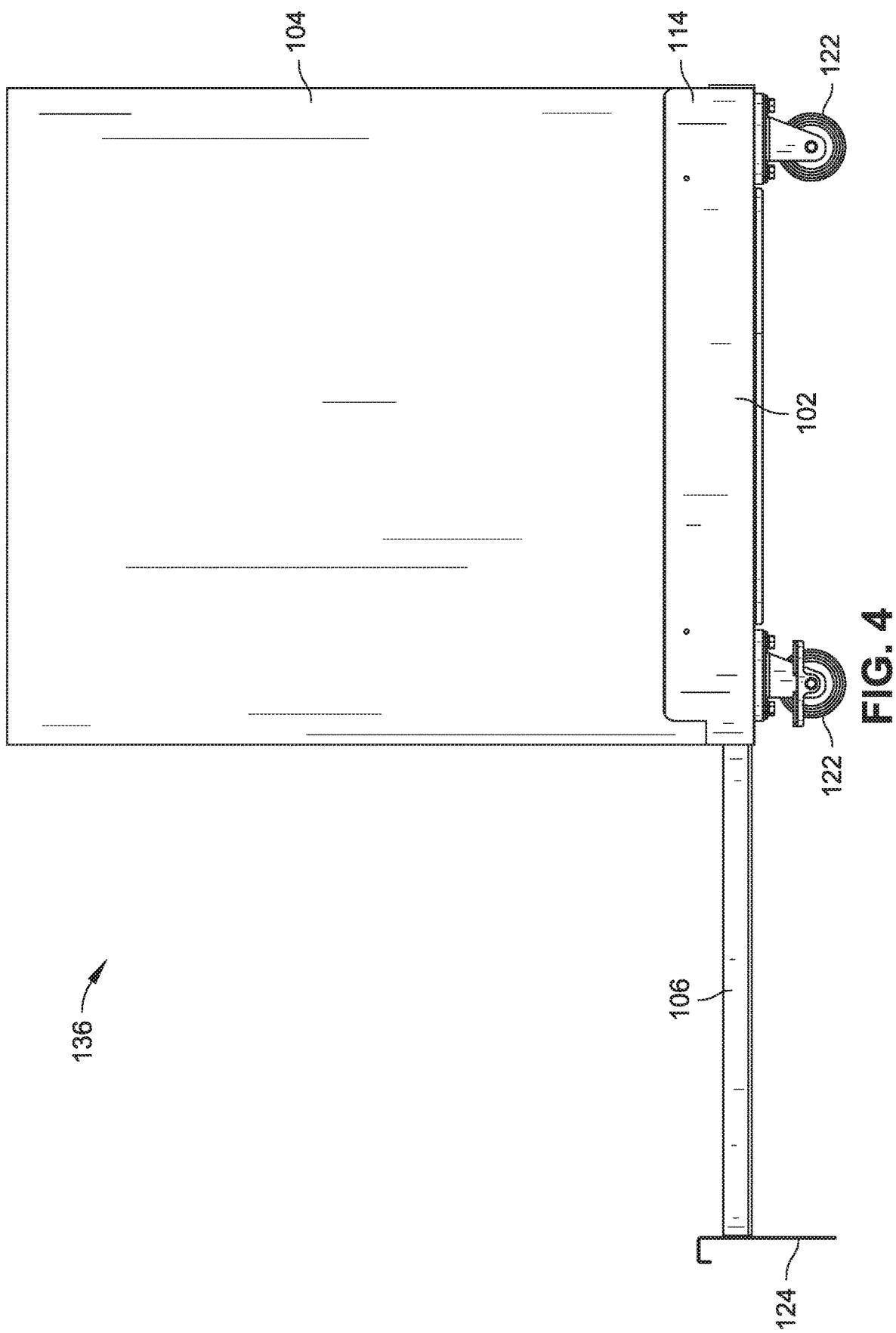
FIG. 4 is a side elevation view of a frying apparatus coupled to the grease catcher apparatus illustrated in FIG. 1, where the grease catcher is depicted with a removable tray in an open configuration, in accordance with an example embodiment of the present disclosure.

The support assembly 102 can further include one or more wheels 122 (and/or mechanical support) configured to allow for rolling movement of the grease catcher apparatus 100 on a support assembly 102 surface (e.g., floor), as illustrated in FIGS. 3 and 4. In one or more embodiments, the support assembly 102 includes four wheels 122, with one wheel disposed at each corner of the base portion 110. The wheeled support assembly 102 allows for movement of the grease catcher apparatus 100 and the frying apparatus 104 (e.g., for positioning the frying apparatus 104, cleaning beneath the support assembly 102, etc.). However, a wheeled support assembly 102 is offered by way of example only and is not meant to be restrictive of the present disclosure. In other embodiments, the support assembly 102 can include one or more legs configured to rest on the support assembly 102 surface, or the support assembly 102 can rest directly on the support assembly 102 surface.

In one or more embodiments, the support assembly 102 can include a toe kick plate 124 configured to abut against a lower edge of the base portion 110 (e.g., as described with reference to FIG. 1). The toe kick plate 124 can be configured to cover an area and/or space formed between the base portion 110 and the support assembly 102 surface. The toe kick plate 124 can prevent debris (e.g., food scraps, grease, dirt, etc.) from accumulating beneath the grease capture apparatus and/or from accumulating near the frying apparatus 104 (e.g., near the valves). Additionally, the toe kick plate 124 can be used as a handle that can provide a user a place to grab and remove the removable tray 106. In some implementations, the toe kick plate 124 can be removably coupled with the base portion 110. For example, the base portion 110 can include a fastener (e.g., magnet) configured for receiving a magnetic toe kick plate 124 (e.g., as described with reference to FIG. 4). The removable toe kick plate 124 permits cleaning beneath the grease capture apparatus. In other embodiments, the toe kick plate 124 can be fixedly secured to the base portion 110 by use of a bonding agent (e.g., two-sided tape, glue, caulk, cement, etc.), a weld, and/or a suitable fastener (e.g., cap screws, screws, bolts, etc.). The toe kick panel can be formed from a variety of materials including, but not necessarily limited to: metal, wood, wood composite, rubber, synthetic rubber, plastic, tile, vinyl, and so forth. The configuration, type, and color of the material can be selected based on several factors such as durability, appearance (e.g., similar to the finish of the grease capture apparatus and/or the frying apparatus 104), ease of cleaning, and so forth. In a specific embodiment, the toe kick plate 124 can include stainless steel.

Figure 5:
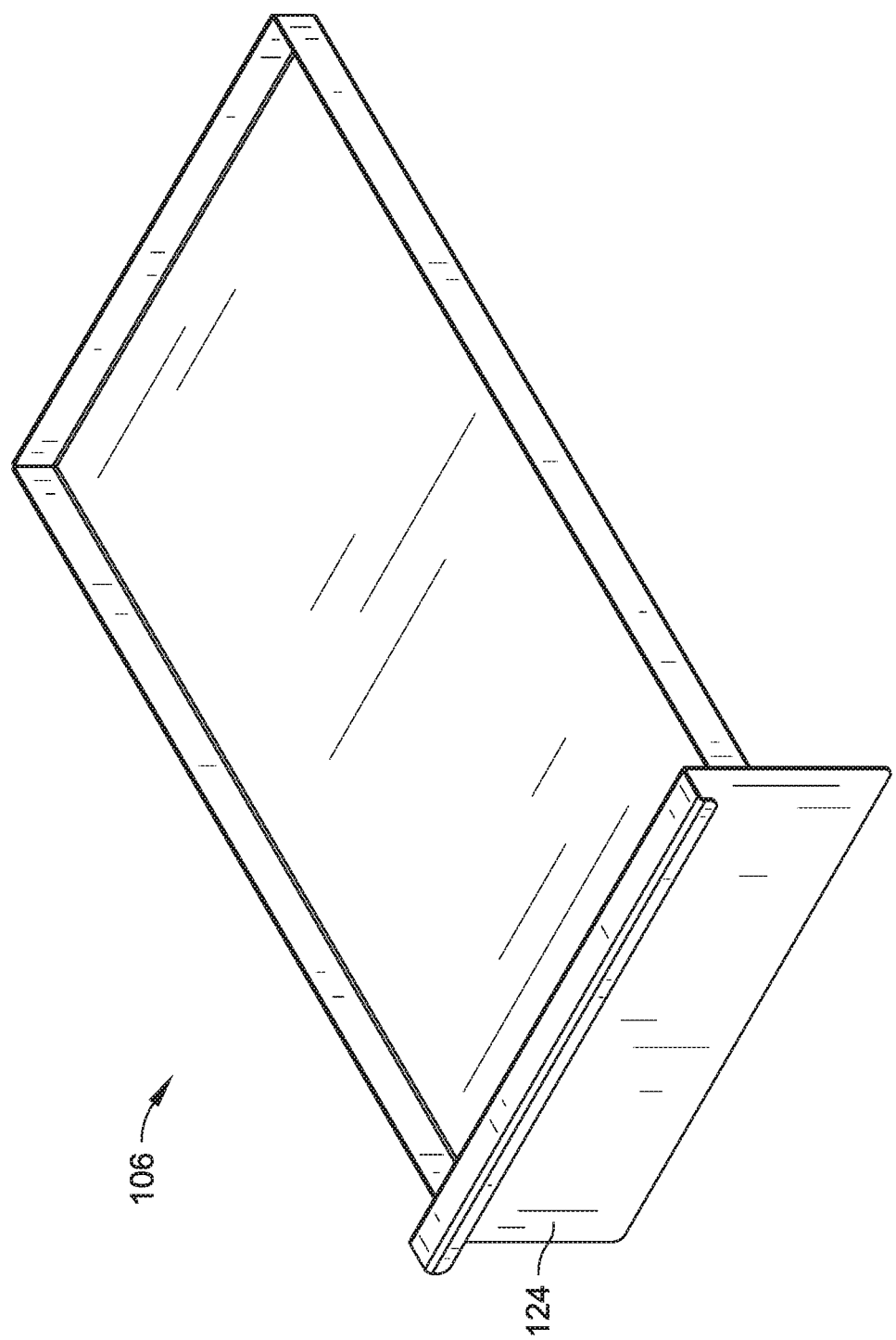
FIG. 5 is an isometric view illustrating a removable tray configured to be used with the grease catcher apparatus illustrated in FIG. 1, in accordance with example embodiments of the present disclosure.

FIGS. 5 and 6 illustrate another embodiment of a grease catcher apparatus 100. In this embodiment, the grease catcher apparatus 100 can include a support assembly 102 having one or more support assembly 102 segments configured for receiving a removable tray 106. For example, the support assembly 102 can include a first support assembly 102 segment and a second support assembly 102 segment positionable across from one another. Each one of the first support assembly 102 segment and the second support assembly 102 segment can include a base ledge 128 for supporting opposite sides of the removable tray 106. In some embodiments, each base ledge 128 can be secured to wheels 122 and/or legs for positioning/moving the grease capture apparatus. Each support assembly 102 segment further includes a side wall 114 extending generally upward from the support assembly 102. In one or more embodiments, the side wall 114 is configured for mounting to a frying apparatus 104. For example, each side wall 114 can include a generally planar upper ledge 132 configured for securing to a base and/or one or more legs of the frying apparatus 104. The frying apparatus 104 can be secured to the support assembly 102 segments utilizing one or more suitable fasteners, including but not necessarily limited to: cap screws, screws, bolts, and so forth. In some implementations, the support assembly 102 segments can include pre-drilled or pre-tapped holes configured to engage the fasteners, wheels 122, and/or legs. In one or more embodiments, the side walls 114 can be sloped towards the tray (e.g., a sloped wall) to direct grease into the tray. For example, each side wall 114 can be generally J-shaped, with a sloped portion 134 extending downwardly from the upper ledge 132 towards the removable tray 106.

In embodiments, the removable tray 106 comprises a generally planar tray and/or at least one side (e.g., side wall 114) extending from the generally planar tray. The tray can be formed from a heat resistant material including, but not necessarily limited to steel, stainless steel, aluminum, other similar metals, silicone, ceramic, and so forth. In one or more embodiments, the tray comprises a standard full-size sheet pan. In embodiments, trays of varying heights can be utilized (e.g., ½ inch, ⅙ inch, ⅓ inch, etc.). In a specific embodiment, the removable tray 106 can include a planar sheet of metal with four sides (e.g., side walls 114) that extend orthogonally from the sheet of metal, where the removable tray 106 is configured to hold a material, such as grease captured from a frying apparatus 104.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A grease catcher apparatus that catches grease from a frying apparatus, comprising:
    a removable tray configured for catching grease from the frying apparatus;
    a support assembly for positioning under the frying apparatus, the support assembly configured to receive the removable tray, the support assembly including at least a first support segment and a second support segment positionable across from one another, each one of the first support segment and the second support segment having a base ledge for supporting opposite sides of the removable tray, wherein the first support segment and the second support segment include a sloping wall configured to slope toward the removable tray for directing the grease into the removable tray; and
    at least one side wall extending generally upwardly from the support assembly.

2. The grease catcher apparatus as recited in claim 1, wherein the removable tray includes a planar tray and four sides that extend from the planar tray.

3. The grease catcher apparatus as recited in claim 1, wherein the removable tray includes stainless steel.

4. The grease catcher apparatus as recited in claim 1, wherein the support assembly includes a partial enclosure defining at least one opening for permitting passage of grease from the frying apparatus to the removable tray.

5. The grease catcher apparatus as recited in claim 4, wherein the support assembly includes two openings for permitting passage of grease from the frying apparatus to the removable tray.

6. The grease catcher apparatus as recited in claim 1, further comprising:
    a toe kick plate coupled to the removable tray.

7. The grease catcher apparatus as recited in claim 6, wherein the toe kick plate is magnetically coupled to the removable tray.

8. The grease catcher apparatus as recited in claim 1, further comprising:
    at least one wheel coupled to the support assembly.

9. The grease catcher apparatus as recited in claim 1, further comprising:
    at least one leg coupled to the support assembly.

10. A cooking system, comprising:
    a frying apparatus; and
    a grease catcher apparatus coupled to the frying apparatus and configured to catch grease falling from the frying apparatus, the grease catcher apparatus including: a removable tray configured for catching grease from the frying apparatus;
        a support assembly for positioning under the frying apparatus, the support assembly configured to receive the removable tray, the support assembly including at least a first support segment and a second support segment positionable across from one another, each one of the first support segment and the second support segment having a base ledge for supporting opposite sides of the removable tray, wherein the first support segment and the second support segment include a sloping wall configured to slope toward the removable tray for directing the grease into the removable tray; and
        at least one side wall extending generally upwardly from the support assembly.

11. The cooking system as recited in claim 10, wherein the frying apparatus includes a deep fryer configured to use hot oil.

12. The cooking system as recited in 10, wherein the removable tray includes a planar tray and four sides that extend from the planar tray.

13. The cooking system as recited in claim 10, wherein the removable tray includes stainless steel.

14. The cooking system as recited in claim 10, wherein the support assembly includes a partial enclosure defining at least one opening for permitting passage of grease from the frying apparatus to the removable tray.

15. The cooking system as recited in claim 14, wherein the support assembly includes two openings for permitting passage of grease from the frying apparatus to the removable tray.

16. The cooking system as recited in claim 10, further comprising:
    a toe kick plate coupled to the removable tray.

17. The cooking system as recited in claim 16, wherein the toe kick plate is magnetically coupled to the removable tray.

18. A cooking system for catching grease from a frying apparatus, comprising:
- a frying apparatus configured to use heated grease for cooking food; and
- a grease catcher apparatus coupled to the frying apparatus and configured to catch grease falling from the frying apparatus, the grease catcher apparatus including: a removable tray configured for catching grease from the frying apparatus;
    - a support assembly for positioning under the frying apparatus, the support assembly configured to support the frying apparatus and the removable tray, the support assembly including at least a first support segment and a second support segment positionable across from one another, each one of the first support segment and the second support segment having a base ledge for supporting opposite sides of the removable tray, wherein the first support segment and the second support segment include a sloping wall configured to slope toward the removable tray for directing the grease into the removable tray;
    - a slot disposed in the support assembly, the slot configured to receive the removable tray;
    - at least one side wall extending generally upwardly from the support assembly, the at least one side wall configured to support the frying apparatus; and
    - at least one opening disposed between the removable tray and the frying apparatus, the at least one opening configured to allow the grease to fall into the removable tray.

19. The cooking system as recited in claim 18, further comprising:
- a toe kick plate coupled to the removable tray.

20. The cooking system as recited in claim 18, wherein the support assembly includes two openings for permitting passage of grease from the frying apparatus to the removable tray.

* * * * *